(12) United States Patent
Lehman

(10) Patent No.: US 9,867,501 B2
(45) Date of Patent: Jan. 16, 2018

(54) AUTOMATIC FOOD PRODUCT LOADING SYSTEM

(71) Applicant: Lon Lehman, Ft. Wayne, IN (US)

(72) Inventor: Lon Lehman, Ft. Wayne, IN (US)

(*) Notice: Subject to any disclaimer, the term of this patent is extended or adjusted under 35 U.S.C. 154(b) by 476 days.

(21) Appl. No.: 14/522,485

(22) Filed: Oct. 23, 2014

(65) Prior Publication Data

US 2015/0107463 A1    Apr. 23, 2015

Related U.S. Application Data

(60) Provisional application No. 61/894,621, filed on Oct. 23, 2013.

(51) Int. Cl.
*A47J 37/06* (2006.01)
*A47J 39/00* (2006.01)

(52) U.S. Cl.
CPC .................... *A47J 39/006* (2013.01)

(58) Field of Classification Search
CPC combination set(s) only.
See application file for complete search history.

(56) References Cited

U.S. PATENT DOCUMENTS

| | | | |
|---|---|---|---|
| 4,066,862 A | 1/1978 | Tippmann | |
| 4,149,840 A | 4/1979 | Tippmann | |
| 4,299,060 A | 11/1981 | Tippmann | |
| 4,398,651 A * | 8/1983 | Kumpfer | G07F 9/02 219/679 |
| 4,547,995 A | 10/1985 | Tippmann | |
| 4,767,581 A | 8/1988 | Tippmann | |
| 4,864,788 A | 9/1989 | Tippmann | |
| 5,004,617 A | 4/1991 | Bowen et al. | |
| 5,086,693 A | 2/1992 | Tippmann et al. | |
| 5,163,356 A * | 11/1992 | Chigira | A47J 27/14 221/150 A |
| 5,201,364 A | 4/1993 | Tippmann et al. | |
| 5,235,903 A | 8/1993 | Tippmann | |

(Continued)

FOREIGN PATENT DOCUMENTS

| | | |
|---|---|---|
| JP | 7289444 A | 11/1995 |
| JP | 2004-209161 A | 7/2004 |

(Continued)

OTHER PUBLICATIONS

Machine translation, KR20100111650A; dated Oct. 15, 2010.*

*Primary Examiner* — Anne M Antonucci
*Assistant Examiner* — Renee LaRose
(74) *Attorney, Agent, or Firm* — Studebaker & Brackett PC

(57) ABSTRACT

A food loading system provides the ability to stage a volume of food in a freezer or cooler that keeps food product safely stored until the product is ready to be transferred to a cooking unit. The food loading system is configured to deliver the food product directly from storage to a loading mechanism for a cooking unit or directly to a cooking unit. The food loading system includes a control panel that accepts operator inputs for transfer of food from storage, or the food loading system may be connected wirelessly or by wire to one or more Point-Of-Sale (POS) devices, such as tablets, cash registers, and the like, and the food loading system uses the input from the POS devices to transfer food automatically from storage to a cooking unit input or directly to a cooking unit.

20 Claims, 4 Drawing Sheets

(56) References Cited

U.S. PATENT DOCUMENTS

| | | | |
|---|---|---|---|
| 5,245,150 A * | 9/1993 | Grandi | A21B 2/00 |
| | | | 165/61 |
| 5,266,766 A * | 11/1993 | Hecox | H05B 6/54 |
| | | | 219/388 |
| 5,318,792 A | 6/1994 | Tippmann | |
| 5,411,753 A | 5/1995 | Tippmann | |
| 5,662,959 A | 9/1997 | Tippmann | |
| 5,680,810 A | 10/1997 | Sham | |
| 5,767,487 A | 6/1998 | Tippmann | |
| 5,921,172 A | 7/1999 | Kiczko et al. | |
| 5,939,125 A | 8/1999 | Tippmann | |
| 5,960,869 A | 10/1999 | Tippmann et al. | |
| 5,993,878 A | 11/1999 | Tippmann | |
| 6,062,129 A | 5/2000 | Tippmann et al. | |
| 6,103,289 A | 8/2000 | Tippmann et al. | |
| 6,145,431 A | 11/2000 | Tippmann et al. | |
| 6,152,024 A | 11/2000 | Tippmann | |
| 6,263,963 B1 | 7/2001 | Tippmann et al. | |
| 6,539,839 B1 | 4/2003 | Tippmann | |
| 6,639,187 B2 | 10/2003 | Arel et al. | |
| 6,751,977 B2 * | 6/2004 | Sands | F25D 25/04 |
| | | | 62/378 |
| 6,753,025 B1 | 6/2004 | Tippmann | |
| 7,063,232 B2 * | 6/2006 | Chirnomas | G07F 11/14 |
| | | | 221/92 |
| 7,348,519 B2 | 3/2008 | Federspiel et al. | |
| 7,538,300 B1 | 5/2009 | Tippmann, Jr. et al. | |
| 7,677,160 B2 | 3/2010 | Tippmann, Sr. et al. | |
| 8,822,886 B2 * | 9/2014 | Lehman | A47J 27/04 |
| | | | 219/386 |
| 2001/0002674 A1 * | 6/2001 | Gubbini | A21C 9/08 |
| | | | 221/13 |
| 2005/0109218 A1 | 5/2005 | Arnedo et al. | |
| 2005/0204927 A1 | 9/2005 | Boyle et al. | |
| 2006/0186133 A1 * | 8/2006 | Chirnomas | G07F 11/04 |
| | | | 221/123 |

FOREIGN PATENT DOCUMENTS

| | | | |
|---|---|---|---|
| KR | 10-0364682 A | 7/2001 | |
| KR | 20100111650 A * | 10/2010 | G07F 11/54 |

\* cited by examiner

AUTOMATIC FOOD PRODUCT LOADING SYSTEM

CROSS-REFERENCE TO RELATED APPLICATIONS

This application claims the benefit of priority to U.S. Provisional Patent Application No. 61/894,621, filed on Oct. 23, 2013, which is hereby incorporated by reference in its entirety.

TECHNICAL FIELD

This disclosure relates to automated food loading systems.

BACKGROUND

In environments where food is handled, moving food from a first location to a second location, such as from a freezer or a cooler to a dispensing location or a cooking location, is a necessary function. Such movements are known to be performed as hand operations on an as-needed basis, requiring movement of food from a freezer to a cooler or line storage location, and then from the cooler or line storage location to a cooking or dispensing location.

SUMMARY

This disclosure provides a food product loading system, comprising a columnar loader unit. The columnar loader unit includes a plurality of load slots formed by a plurality of walls. Each wall of the plurality of walls is positioned a spaced distance from at least one other wall of the plurality of walls. The columnar loader unit is configured to be oriented in a first position to permit a food product to be loaded into at least one of the plurality of load slots, and in a second position to transfer food product approximately simultaneously from the plurality of load slots into a plurality of cooking slots.

This disclosure also provides a food heating device configured to heat a food product, comprising a plurality of vertically oriented cooking slots and a food product loading system. The plurality of vertically oriented cooking slots is arranged to be positioned side-by-side, with at one heating surface positioned between two adjacent vertically oriented cooking slots. The food product loading system includes a columnar loader unit including a plurality of load slots formed by a plurality of walls. Each wall is positioned a spaced distance from at least one other wall. The columnar loader unit is configured to be oriented in a first position to load food product into the plurality of load slots, and in a second position to permit the approximately simultaneous transfer of food product from the plurality of load slots into the at least two vertically oriented cooking slots.

Advantages and features of the embodiments of this disclosure will become more apparent from the following detailed description of exemplary embodiments when viewed in conjunction with the accompanying drawings.

DETAILED DESCRIPTION

Figure 1:
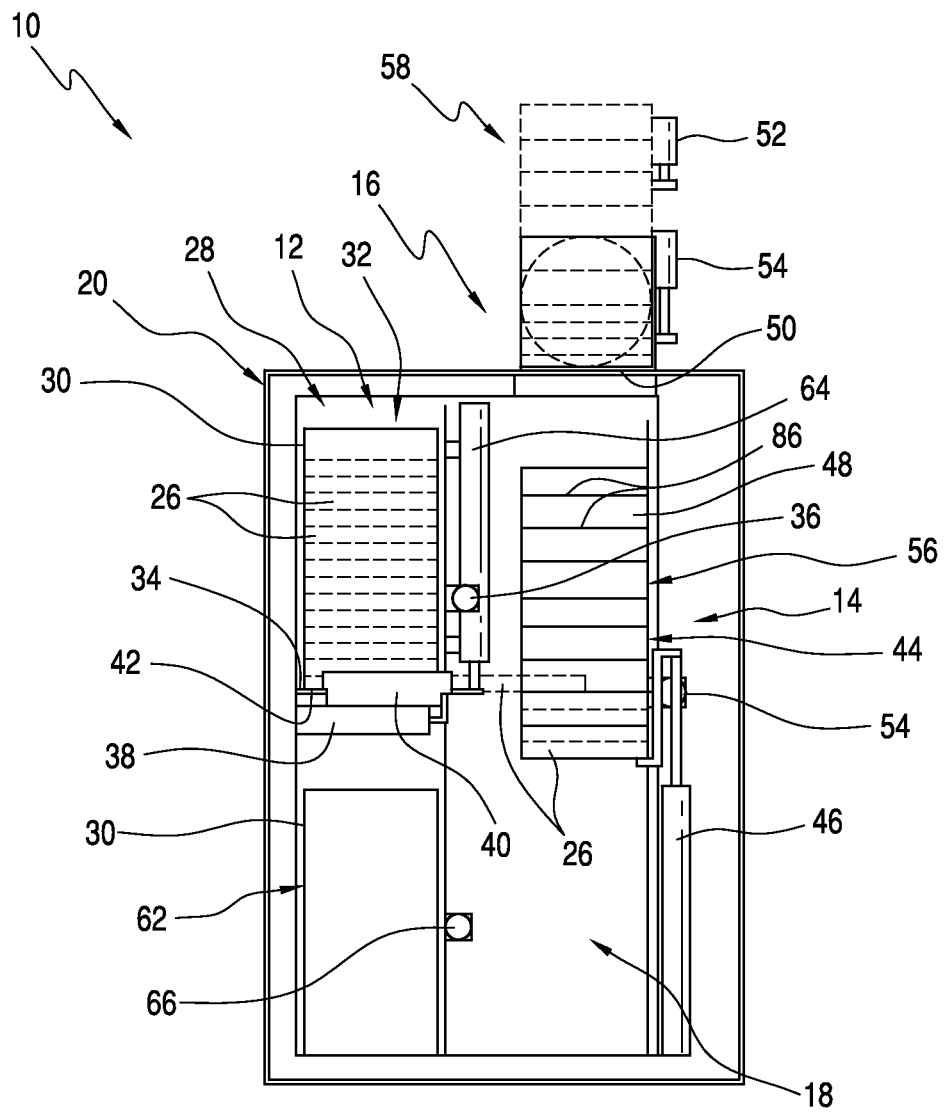
FIG. 1 is a front view of an automatic food loading system in accordance with an exemplary embodiment of the present disclosure, along the lines 1-1 in FIG. 3.
Figure 2:
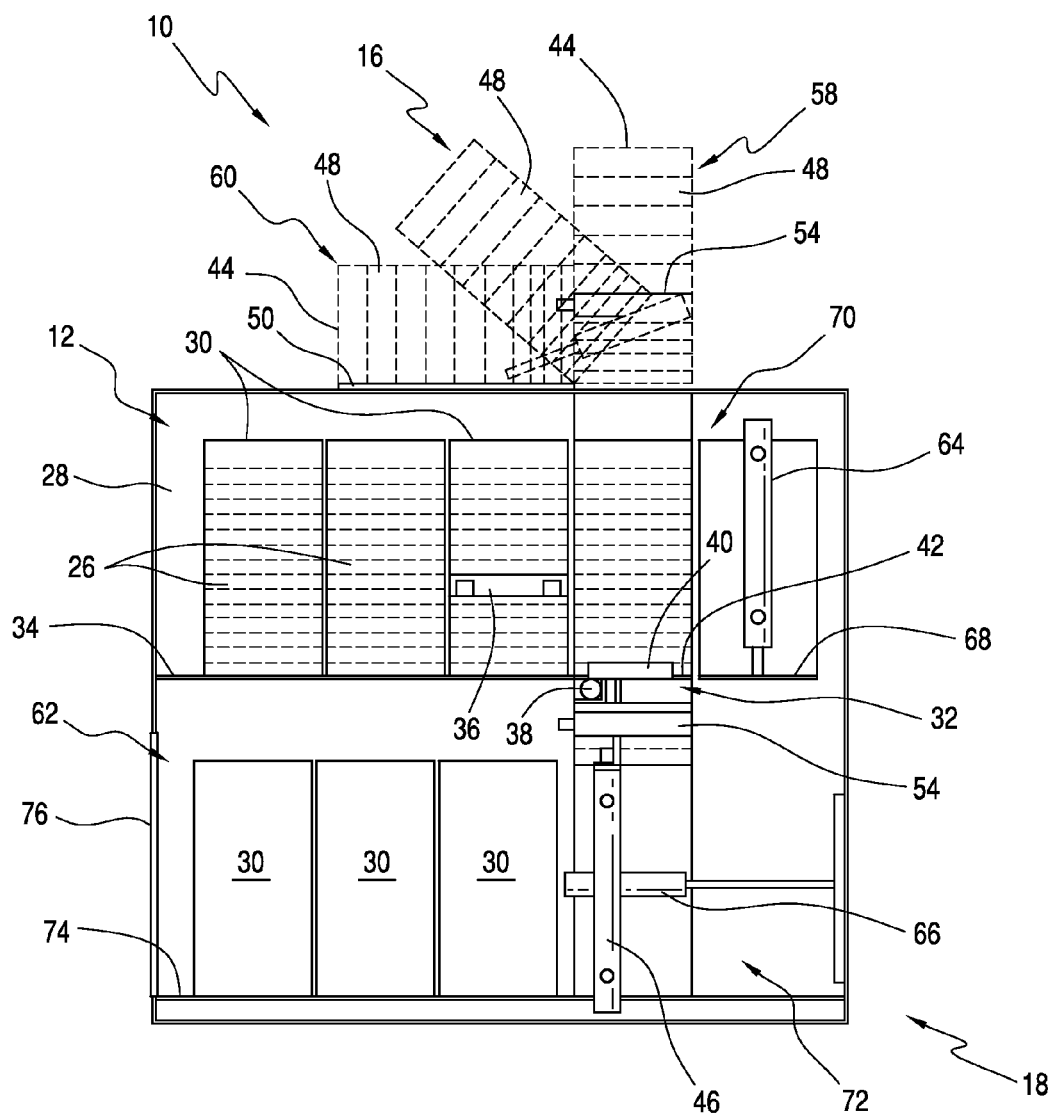
FIG. 2 is a side view of the automatic food loading system of FIG. 1 along the lines 2-2 in FIG. 3.
Figure 3:
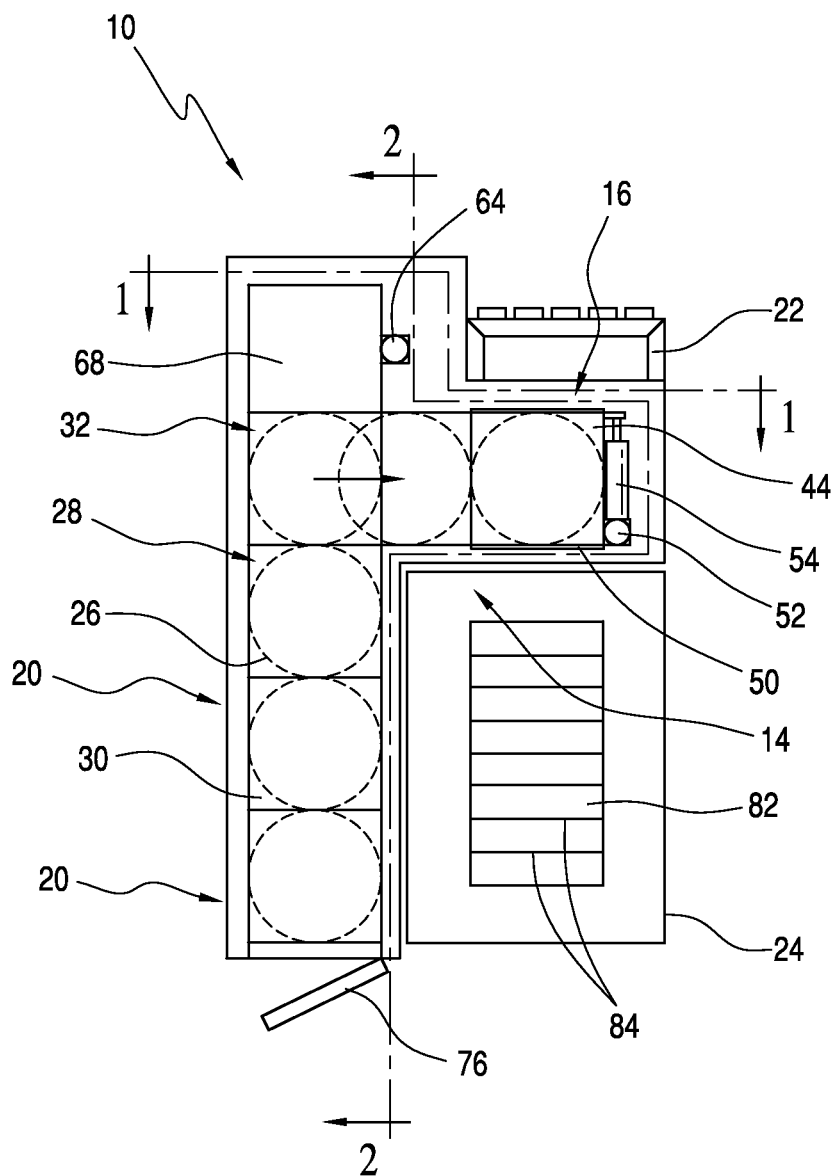
FIG. 3 is a top view of the automatic food loading system of FIG. 1, and a vertical grill.

Referring to FIGS. 1-3, an automatic food product loading system or food loading system is shown and generally indicated at 10. In a high-volume cooking environment, it is presently known to store food in freezers or coolers, and to move the food manually from a freezer to a storage location in proximity to various cooking devices, such as grills of various configurations. While manual systems have functioned adequately, an automatic system of moving food directly from a freezer to a cooking unit would decrease labor costs and reduce the risk that food will be unavailable during peak sales times, such as during traditional breakfast, lunch, and dinner times. Food loading system 10 provides the ability to stage a volume of food in a freezer that keeps food product safely stored until the product is ready to be transferred to a cooking surface of a cooking unit. Food loading system 10 also delivers food product directly from storage to a loading mechanism for a cooking unit or directly to a cooking unit. Food loading system 10 includes a control panel that accepts operator inputs for transfer of food from storage, or system 10 may be connected wirelessly or by wire to one or more Point-Of-Sale (POS) devices, such as tablets, cash registers, and the like, and system 10 uses the input from the POS devices to transfer food automatically from storage to a cooking unit input or directly to a cooking unit.

Food loading system 10 includes a storage system 12, a food transfer system 14, a loader system 16, and a cartridge holding system 18. Storage system 12 holds filled food cartridges, food transfer system 14 moves a food product 26 from food cartridges to loader system 16, and cartridge holding system 18 moves empty cartridges into a holding area or portion. Food loading system 10 also includes a freezer or cooler system 20 in which storage system 12, food transfer system 14, loader system 16, and cartridge holding system 18 are at least partially positioned, and a control system 22 that determines the quantity of food product 26 to be moved from storage system 12 to loader system 16 for movement to a cooking unit, such as a vertical grill 24 shown in FIG. 3. Vertical grill 24 may be a grill such as that shown in U.S. Pat. No. 8,367,977, the entire content of which is incorporated herein by reference in its entirety.

Frozen or cooled food product 26 is kept in storage system 12 until control system 22 enters a quantity of food product 26 to be transferred from storage system 12 to loader system 16. Food product 26 is positioned to permit food transfer system 14 to move food product 26 from storage system 12 to loader system 16. Once a cartridge of storage system 12 is emptied, which is tracked by control system 22, the empty cartridge is moved to a position where cartridge holding system 18 is able to move the empty cartridge to an empty cartridge holding location within food loading system 10. Food product 26 within loader system 16 moves from an interior of freezer or cooler system 20 to an exterior of system 20 for transfer from loader system 16 to an input of a cooking unit, such as vertical grill 24. In the exemplary embodiment, food product 26 is transferred directly from loader system 16 into a plurality of vertically oriented heating or cooking slots 82 positioned in a side-by-side configuration in vertical grill 24, such that at least one heating surface 84 is positioned between each adjacent pair of cooking slots 82. In an exemplary embodiment, each cooking slot 82 includes a heating or cooking surface 84 on each side of the cooking slot, and thus, a pair of heating or cooking surfaces 84 is positioned between each adjacent pair of cooking slots.

Food product 26 includes, but is not limited to, chicken patties or breasts, hamburger patties, fish patties, vegetable burgers, and other similar foods suitable for handling in the slotted configuration described herein. While food product 26 is typically configured in the shape of a patty, the patty may be irregularly shaped and may have some variation in thickness as long as the configuration of the patty permits the patties to be stacked and to slide with respect to each other in order to be loaded. In the embodiments presented herein, food product 26 would normally be frozen, which provides for ease of movement of food product 26 as described herein. Further, the intense heat of vertical grill 24 is capable of taking food product 26 from a frozen condition to a cooked condition much faster than conventional cooking methods, such as a grill, pan, griddle, etc., so that a frozen condition is a non-issue with respect to cooking time. However, food product 26 that is sufficiently cohesive during the handing described herein may be used in a thawed or unfrozen condition. For example, un-breaded whole breast chicken patties may be transferred thawed with minimal handling degradation.

Storage system 12 includes a staging compartment 28 positioned in freezer system 20. Staging compartment 28 is configured to hold a plurality of food storage containers or cartridges 30. Each cartridge 30 is capable of holding a plurality of food products 26. Each cartridge 30 engages with an adjacent cartridge 30, so that movement of one cartridge 30 moves all cartridges 30, or, alternatively, cartridges 30 are loaded onto a conveyor for moving cartridges 30 to a transfer position 32. In the exemplary embodiment, each cartridge 30 contains an interlocking mechanism (not shown) that permits an empty cartridge 30 to disengage from full cartridges 30 by a downward movement of empty cartridge 30, described in more detail hereinbelow.

In the exemplary embodiment, staging compartment 28 includes a horizontal or transverse staging compartment platform 34 that is planar and has a relatively low coefficient of friction with respect to cartridges 30 to permit cartridges 30 to slide relatively easily in a horizontal or transverse direction along staging compartment platform 34 into transfer position 32. Movement of cartridges 30 from staging compartment 28 to transfer position 32 may be accomplished by a loaded cartridge advance cylinder 36, which engages a portion of cartridge 30 to move cartridge 30 horizontally or transversely from staging compartment 28 into transfer position 32. When loaded cartridge advance cylinder 36 retracts, cylinder 36 moves away from an advance cylinder engaging feature on cartridge 30 in transfer position 32 to a location in proximity to an advance cylinder engaging feature on the next cartridge 30 in staging compartment 28. In actual use, one or more cartridges 30 are loaded with food product 26 prior to a cooking event. Cartridges 30 may be loaded with a predetermined number of food products 26, or with a volume of food product 26 that is entered into control system 22, or a sensor (not shown) positioned adjacent to transfer position 32 may indicate the status of food product 26 in cartridge 30 at transfer position 32. Loaded cartridges 30 are positioned in staging compartment 28 by an operator and, in the exemplary embodiment, engaged to each other so that movement of a loaded cartridge 30 from staging compartment 28 to transfer position 32 causes any other loaded cartridges 30 in staging compartment 28 to be moved horizontally or transversely toward transfer position 32.

It should be noted that the term vertical generally means away from the ground, in the direction of the pull of gravity, or up and down. The terms transverse and horizontal are orthogonal or perpendicular to vertical, or approximately parallel to a floor or ground. The terms "away" and "toward" should be understood to mean in directions that lengthen or shorten a distance to a referenced object or feature, respectively.

Food transfer system 14 includes transfer position 32, a transfer cylinder 38, and a transfer device 40. Control system 22 determines the quantity of food product necessary to be cooked. As previously noted, such determination may be by way of an operator entry or may be by receiving inputs from a plurality of POS devices. In another embodiment, control system 22 may be programmed for an initial quantity of food to be cooked at specific time intervals, with additional amounts to be cooked on an as-needed basis using operator entry or POS entry.

Control system 22 commands transfer cylinder 38 to move the required number of food products 26 from cartridges 30 into loader system 16. Transfer cylinder 38 engages transfer device 40, which moves individual food products 26 from an end of cartridge 30 into loader system 16, such as an upper or top end or a lower or bottom end. In the exemplary embodiment, food products 26, which are preferably frozen to withstand the rigors of movement and contact with adjacent food product 26, are moved from the bottom or lower end of cartridge 30 into loader system 16. In another embodiment, food products 26 are moved from a top end portion of cartridge 30 into loader system 16. Transfer device 40 includes a kick-out mechanism to move transfer device 40 away from cartridge 30 during retraction of transfer cylinder 38 to prevent moving or damaging the next food product 26 in cartridge 30. Subsequently, transfer device 40 moves into cartridge 30 to a position where transfer device 40 is able to move another food product 26. Because cartridge 30 extends in a vertical direction, and because food product 26 is stacked vertically within cartridge 30, in the exemplary embodiment the movement of one food product 26 from cartridge 30 to loader system 16 causes all remaining food product 26 in cartridge 30 to drop vertically or downwardly toward a bottom 42 of cartridge 30. Once cartridge 30 is empty, cartridge 30 is advanced transversely or horizontally into cartridge holding system 18, which moves empty cartridge 30 into an empty cartridge holding area.

Loader system 16 includes a columnar loader unit 44 and a loader cylinder 46. In the exemplary embodiment, loader cylinder 46 is configured to position loader unit 44 in a plurality of positions that extend in a vertical or up and down direction. Loader unit 44 includes a plurality of loader unit slots, load unit slots, load slots, or load unit pockets 48 formed by a plurality of walls 86, with each wall 86 configured to be approximately parallel to adjacent walls 86, and a spaced distance from at least one other adjacent wall 86 (since the end wall will be adjacent only to one wall). Loader cylinder 46 moves loader unit 44 vertically in a plurality of loading positions 56 so that food transfer system 14 is able to transfer one food product 26 from cartridge 30 into each loader unit slot 48. In another embodiment, cartridge 30 is moved to a plurality of positions that permit transfer of food product 26 to each empty loader unit slot 48. Loader unit 44 also includes a loader unit door 50, a loader door cylinder 52, and a loader tilt cylinder 54. Loader unit door 50 covers two adjacent sides of loader unit 44, with each side including a plurality of door openings (not shown) that permit food product 26 to be moved into loader unit slots 48 and permit food product 26 to exit loader unit 44, described further hereinbelow. After loader unit 44 contains the amount of food product 26 requested by control system 22, which may be one food product 26 to each loader unit slots 48 located in loader unit 44, loader door cylinder 52 is actuated by control system 22, moving loader unit door 50 vertically from a position that permits food to be loaded into loader unit slots 48 to a position that closes or covers loader unit slots 48. Loader unit door 50 covers two sides of loader unit 44, which keeps food product 26 positioned in loader unit slots 48 during a tilting operation described hereinbelow.

Once loader unit door 50 is in a closed position, loader cylinder 46 lifts loader unit 44 vertically from loading position 56 through a top of freezer 20 to an extended position 58, shown in phantom lines in FIGS. 1 and 2. Once in extended position 58, loader tilt cylinder 54 extends, causing loader unit 44 to tilt approximately 90 degrees from vertical extended position 58 to a horizontal delivery position 60. Horizontal delivery position 60 positions loader unit slots 48 directly above either a food cooking unit, such as vertical grill 24, or above a conveyor or other loader (not shown) that transports food to a food cooking unit (not shown). After loader unit 44 reaches delivery position 60, control system 22 transmits a signal to loader door cylinder 52 to move loader unit door 50 from a closed position to an open position, permitting food product 26 to release and drop under the force of gravity from loader unit slots 48 into vertically oriented cooking slots 82 in vertical grill 24 or onto a conveyor or other food transport device. Because loader unit 44 was moved from a vertical orientation to a horizontal or transverse orientation by the action of loader tilt cylinder 54, the movement of loader unit door 50 in the delivery position is horizontal or transverse to the vertical direction. The time required for food product 26 to drop from loader unit slots 48 is significantly less than one second, so after a predetermined time interval, which may be one or two seconds, control system 22 transmits a signal to loader tilt cylinder 54 to move loader unit 44 from delivery position 60 to extended position 58. Loader cylinder 46 then moves loader unit 44 from extended position 58 to one of the plurality of loading positions 56. During movement of loader unit 44 from delivery position 60 to loading position 56, loader unit door 50 may remain open since food product no longer needs retained in loader unit slots 48. Alternatively, loader unit door 50 may be closed prior to movement, or during movement.

In the exemplary embodiment, loader unit 44 is described as having certain positional characteristics, including tilting from a vertical position to a horizontal or transverse position. Loader unit 44 may be positioned in other orientations for loading of food product 26 into a cooking unit or onto a conveyor or other food transport device for movement to or into a cooking unit. For example, loader unit 44 may be oriented in the range of 0 degrees to less than 45 degrees from a horizontal orientation, and the coefficient of friction between each food product 26 and respective surfaces forming loader unit slots 48 causes food product 26 to slide downwardly into a cooking unit or a conveyor or other food transport device. In yet another embodiment (not shown), loader unit 44 may include an unloading mechanism that approximately simultaneously moves all food product 26 from loader unit slots 48 into a plurality of horizontally or transversely oriented cooking slots. While loader unit 44 is configured to permit the simultaneous movement of all food product 26 from loader unit slots 48 into vertically oriented cooking slots 82, variations in the movement of openings formed in loader unit door 50, coefficient of friction of surfaces 86, the shape of food product 26, etc., may lead to minor differences in the timing of movement of individual pieces of food product 26.

Food product 26 is preferably moved into all cooking slots, such as vertically oriented cooking slots 82 of vertical grill 24, simultaneously because cooking of food product 26 begins the moment food contacts heating or cooking surface 84 of cooking slots 82. Moving food product 26 into cooking slots 82 one at a time could cause the first food product 26 loaded into cooking slots 82 to be cooked before the last food product 26 is loaded into cooking slots 82, presenting difficulties in removing individual food products 26 that have completed the cooking process. Furthermore, one advantage of cooking units such as vertical grill 24, and food loading system 10 is the rapid loading, simultaneous or parallel cooking, and rapid unloading of food product 26. Thus, regardless of orientation of loader unit 44 during a loading process, all food product 26 positioned in parallel in loader unit 44 is simultaneously transferred to a cooking unit or a conveyor or other food transport device. As noted previously, simultaneous transference may be by an unloading mechanism (not shown) or by the force of gravity.

Once one cartridge 30 in transfer position 30 is empty, cartridge 30 needs moved to make room for another cartridge 30 containing food product 26. When loaded cartridge advance cylinder 36 moves a full cartridge 30 to transfer position 32, if an empty cartridge 30 is in transfer position 32, it is moved horizontally or transversely from transfer position 32 to a platform 68, which is part of cartridge holding system 18. Cartridge holding system 18 further includes a vertically oriented lowering cylinder 64 and an empty cartridge advance cylinder 66. When control system 22 determines that an empty cartridge 30 has been moved to platform 68 by the action of loaded cartridge advance cylinder 36, control system 22 next sends a signal to lowering cylinder 64 to move platform 68 vertically from an upper portion 70 of freezer 20 to a lower portion 72 of freezer 20. Because the engagement of cartridge 30 with an adjacent cartridge 30 permits cartridge 30 to move freely in a downward direction, an empty cartridge 30 readily disengages from a horizontally or transversely adjacent full cartridge 30 as empty cartridge 30 travels on platform 68 from upper portion 70 to lower portion 72. Once platform 68 is directly adjacent to a lower portion platform 74 of freezer 20, in an empty cartridge holding location 62 of freezer system 20 so that a top surface of platform 68 is even with or slightly higher than a top surface of lower portion platform 74, control system 22 transmits a control signal to empty cartridge advance cylinder 66 to actuate, which pushes an empty cartridge 30 from platform 68 onto lower portion platform 74, the surface of which has a sufficiently low coefficient of friction to permit horizontal or transverse sliding movement of empty cartridges 30. Freezer or cooler system 20 includes an access door 76 that permits an operator access to the interior of freezer or cooler system 20 to be able to load full cartridges 30 onto staging compartment platform 34 and to remove empty cartridges from lower portion platform 74.

The description provided hereinabove includes a variety of devices labeled cylinders. Such cylinders may be pneumatic or hydraulic cylinders, or may be other devices that provide similar motion, such as linear actuators or solenoids.

Thus, the term cylinder is a general term for a device that provides the motion needed to accomplish the system described hereinabove.

Figure 4:
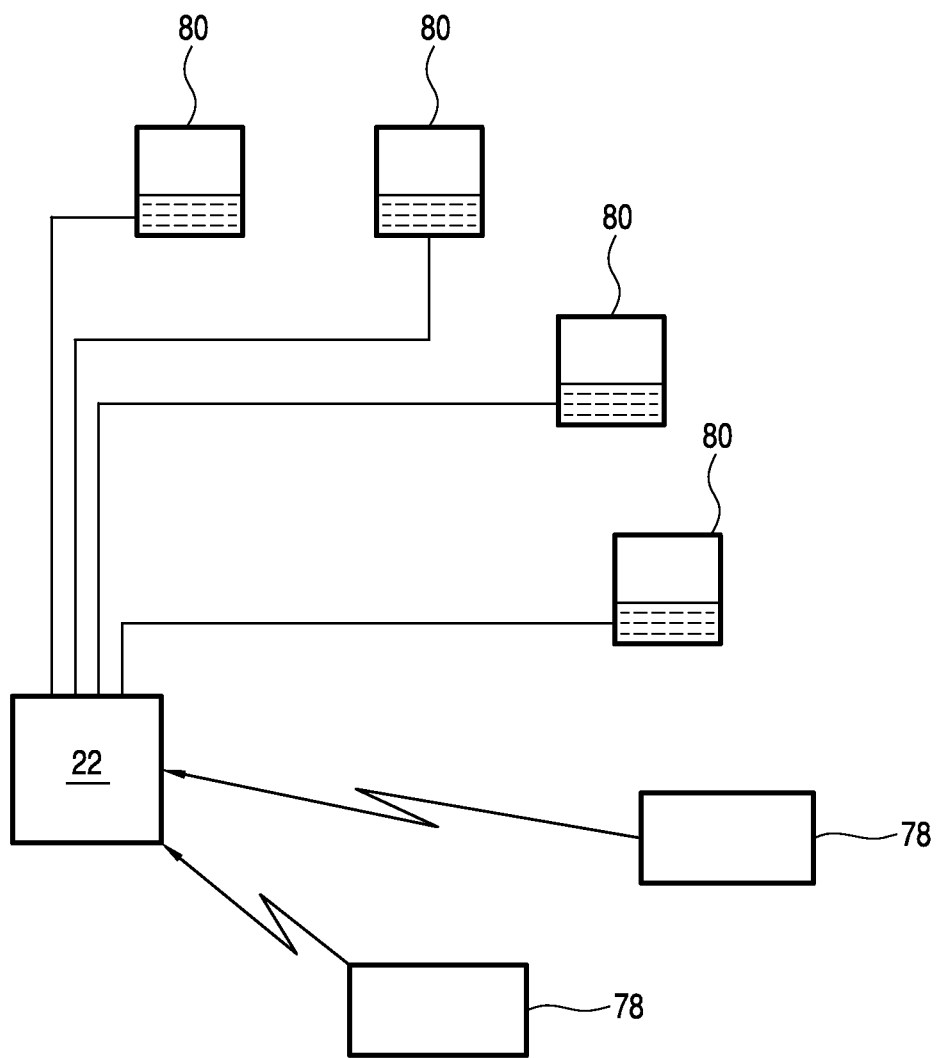
FIG. 4 is a view of a portion of a system configured to provide inputs to the automatic food loading system of FIG. 1.

Referring to FIG. 4, an implementation of automatic food loading system 10 in a working environment is shown. Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Control system 20, which includes a controller and either a wire harness or a wireless data system, may receive signals from a variety of locations indicative of a demand for cooked food product 26. Control system 22 aggregates the demand from multiple locations, such as one or more wireless data entry or POS devices 78 and/or one or more cash registers 80 or similar devices. Using the aggregated demand from all data sources, control system 22 transmits control signals to food transfer system 14 to move food product 26 to loader system 16. If a cartridge 30 empties prior to the achieving a full loader unit 44, control system 22 moves a cartridge 30 containing food product 26 to transfer position 32 so that additional food product 26 may be loaded into loader unit 44 until loader unit 44 reaches the capacity required by control system 22 or the capacity of loader unit 44. Once loader system 44 has reached the capacity set by control system 22 or full capacity, control system 22 extends loader unit 44 vertically from freezer unit 20 and positions loader unit 44 to load a cooking unit, such as vertical grill 24, or an input to a cooking unit. Vertical grill 24 also communicates with control system 22 and provides signals indicating readiness to receive uncooked food product 26. Food product 26 is cooked using the described process until the needs of all POS inputs have been met.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

I claim:

1. A food product loading system, comprising:
a columnar loader unit including a plurality of load slots formed by a plurality of walls, each wall of the plurality of walls positioned a spaced distance from at least one other wall of the plurality of walls; wherein
the columnar loader unit is configured to be positioned in a first orientation to permit a food product to be loaded into at least one of the plurality of load slots, and the columnar loader unit is movable through an angle from the first orientation to a second orientation to transfer food product approximately simultaneously from the plurality of load slots into a plurality of cooking slots.

2. The food product loading system of claim 1, wherein the first orientation is vertical, and the second orientation is horizontal.

3. The food product loading system of claim 2, wherein the second orientation is approximately 90 degrees from the first orientation.

4. The food product loading system of claim 1, further including a cooled compartment configured to store at least one storage container, and a transfer system configured to transfer food product from the storage container to the columnar loader unit.

5. The food product loading system of claim 4, wherein the cooled compartment is a freezer compartment.

6. The food product loading system of claim 1, further including a storage system and a transfer system, the transfer system configured to move food product from the storage system to the columnar loader unit.

7. The food product loading system of claim 6, wherein the food product loading system is configured to receive a demand for food product from a plurality of locations and to automatically transfer food product from the storage system to the columnar loader unit in response to the demand.

8. The food product loading system of claim 7, wherein the plurality of locations includes at least one point of sale device.

9. The food product loading system of claim 1, wherein the food product loading system is configured to extend the columnar loader unit through a top portion of the food product loading system before moving the columnar loader unit from the first orientation to the second orientation.

10. The food product loading system of claim 1, wherein the columnar loader unit includes a door that is configured with a closed position for the retention of food product and an open position to permit food product to drop from the columnar loader unit.

11. A food heating device configured to heat a food product, comprising:
 a plurality of vertically oriented cooking slots arranged to be positioned side-by-side, with at least one heating surface positioned between two adjacent vertically oriented cooking slots; and
 a food product loading system including a columnar loader unit including a plurality of load slots formed by a plurality of walls, each wall positioned a spaced distance from at least one other wall, the columnar loader unit configured to be positioned in a first orientation to load food product into the plurality of load slots, and the columnar loader unit being positioned in a second orientation at an angle to the first orientation to permit the approximately simultaneous transfer of food product from the plurality of load slots into the at least two vertically oriented cooking slots.

12. The food heating device of claim 11, wherein the first orientation is vertical, and the second orientation is horizontal.

13. The food heating device of claim 12, wherein the second orientation is approximately 90 degrees from the first orientation.

14. The food heating device of claim 11, further including a cooled compartment configured to store at least one storage container and a transfer system configured to transfer food product from the storage container to the columnar loader unit.

15. The food heating device of claim 14, wherein the cooled compartment is a freezer compartment.

16. The food heating device of claim 11, further including a storage system and a transfer system, the transfer system configured to move food product from the storage system to the columnar loader unit.

17. The food heating device of claim 16, wherein the food product loading system is configured to receive a demand for food product from a plurality of locations and to automatically transfer food product from the storage system to the columnar loader unit in response to the demand.

18. The food product loading system of claim 17, wherein the plurality of locations includes at least one point of sale device.

19. The food heating device of claim 11, wherein the food product loading system is configured to extend the columnar loader unit through a top portion of the food product loading system before moving the columnar loader unit from the first orientation to the second orientation.

20. The food heating device of claim 11, wherein the columnar loader unit includes a door that is configured with a closed position for the retention of food product and an open position permit food product to drop from the columnar loader unit.

* * * * *

UNITED STATES PATENT AND TRADEMARK OFFICE
CERTIFICATE OF CORRECTION

PATENT NO. : 9,867,501 B2
APPLICATION NO. : 14/522485
DATED : January 16, 2018
INVENTOR(S) : Lon Lehman et al.

Page 1 of 1

It is certified that error appears in the above-identified patent and that said Letters Patent is hereby corrected as shown below:

On the Title Page

Please correct item (76) as shown below:
--(76) Inventors: Lon Lehman, Ft. Wayne, IN (US)
　　　　　　　　　Eugene Tippmann, Jr., Ft. Wayne, IN (US)--

Signed and Sealed this
Eighteenth Day of September, 2018

Andrei Iancu
*Director of the United States Patent and Trademark Office*